Dec. 26, 1939.   N. H. GREEN   2,184,939
WELD SPLASH SHIELD
Filed Nov. 23, 1938

INVENTOR.
NORVAL H. GREEN
BY Charles McClair
ATTORNEY.

Patented Dec. 26, 1939

2,184,939

UNITED STATES PATENT OFFICE 2,184,939

WELD SPLASH SHIELD

Norval H. Green, North Arlington, N. J., assignor, by mesne assignments, to Radio Corporation of America, New York, N. Y., a corporation of Delaware Application November 23, 1938, Serial No. 241,925

4 Claims. (Cl. 250—27.5)

My invention relates to electron discharge devices with metal envelopes, particularly to means for preventing molten metal from splashing from welded joints in the metal envelope.

A header now extensively used to close the flanged end of a metal shell radio tube envelope comprises a glass disc joined to a metal ring, U-shaped in cross section, the ring being telescoped into the shell and joined to the shell with a flange on the ring welded to the shell flange. The small clearance between the ring of this type header and the shell makes it difficult to introduce a shield inside the header-to-shell welding area that will effectively prevent the inward extrusion of molten metal.

The object of my invention is a weld splash shield for preventing the extrusion of metal into a radio tube envelope from the welded area between the shell and header.

Figure 1:
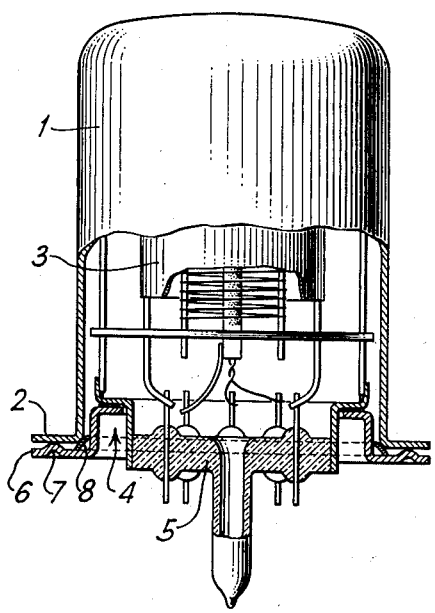
Figure 2:
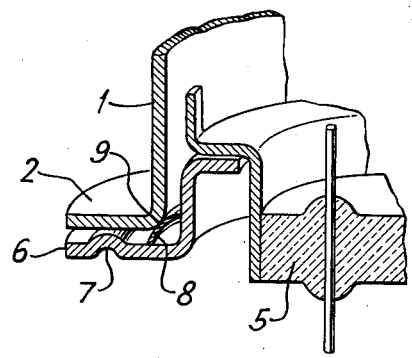
Figure 3:
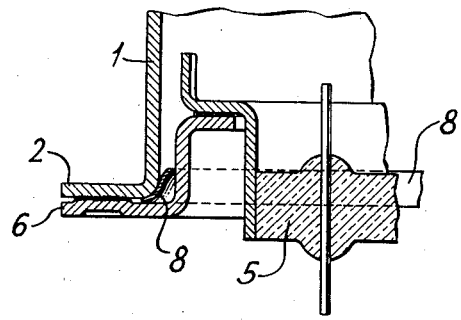
Figure 4:
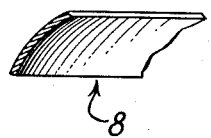
Figure 5:
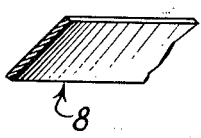
Figure 6:
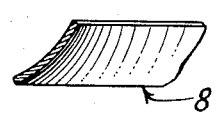

The novel features which I believe to be characteristic of my invention are defined with particularity in the appended claims and the preferred embodiments of the invention are described in the following specification and shown in the accompanying drawing in which Figure 1 shows in section my improved electron discharge device, Figures 2 and 3 show in enlarged detail shell and header of a metal envelope radio tube with my improved weld splash shield, and Figures 4, 5 and 6 show preferred shapes of my improved weld splash shield.

The usual metal envelope, Figure 1, of receiving tubes may comprise a cup-shaped shell 1 with a flanged rim 2 at its open end and containing a conventional electrode assembly 3. The closure means or header for the shell is a ring 4, U-shaped in cross section, closed by a glass disc 5 carrying lead-in conductors, and joined to the shell flange by a radially extending flange 6. The rim of the shell is positioned concentrically upon the header and in registry with the raised bead or boss 7 formed in the face of the header flange. After the tube is assembled and the header is ready to be sealed to the shell, a hollow welding electrode is slid over the shell to bring its annular face against the shell flange. A cooperating welding electrode engaging the lower face of the header flange serves with the upper electrode to compress the shell and header flanges into welding engagement. The high current and pressure necessary to make a good weld extrudes molten metal and splashes particles of the metal inside the envelope.

To prevent the inward extrusion of metal from the header-to-shell weld, I propose according to my invention to place a thin metal band or bezel 8, beveled inwardly from bottom to top, over the header ring with its bottom and outer edge resting on the header flange as best shown in Figure 2. When the shell is lowered over the header the rim 9 of the shell at the bend between the shell flange and shell cylinder wall comes to rest on the sloping surface of the bezel, and the shell is deflected into position concentric with the header. As the shell is moved downward by the welding electrode, a pressure fit is established along the annular contacting areas between the band and shell rim and between the band and header flange. When finally the shell flange contacts the boss 7 and welding current flows to soften the metal of the flange and boss, and the two flanges are pressed together in welded engagement, the band yields before the advance of the shell and assumes the shape shown in Figure 3. While the inside diameter of the band 8 may be sufficiently larger than the outside diameter of the header ring 4 and the electrode mount on the header to permit the band to be easily dropped in place during assembly, the inner edge of the band may be forced against the outer wall of the header ring as the band is squeezed. Since the inner and outer edges of the band are supported, the band may be distorted at its center by the oncoming shell rim 9 only with considerable pressure. This insures a tight yet yielding fit between the band, shell and header so that during the welding operation the band 8 effectively closes all paths to molten metal from the welding area to the interior of the envelope.

To prevent the inward extrusion of molten metal between the header and shell flanges according to my invention, it is merely necessary that the sloping surface of the metal band 8 come into firm contact with the rim 9 of the shell before the boss 7 engages the shell flange 2 and before welding current flows. This requirement for a positive seal to the flow of molten metal may be fulfilled with a bezeled or beveled band of any desired configuration. Depending upon the relative sizes of the header ring and shell, and upon the curvature of the rim at 9 and height of boss 7, the shape of the band may be cup-shaped with a convexed outer surface as shown in Figures 1, 2 and 4 or concaved with an outer surface as shown in Figure 6 or with a conical surface as shown in Figure 5. These weld splash shields do not leave two thicknesses of the shield between the header and shell flanges after the weld is made, as in the weld splash shield shown in Michell 2,086,985, assigned to the assignee of this application, and is particularly adapted to headers which telescope into the shell.

Electron discharge devices constructed according to my invention prevent the extrusion or splashing of molten metal into the envelope of the device from the welded areas between the shell and header. Since modifications may be made in the structure above described, without departing from the spirit of my invention, it is desired that my invention be limited only by the prior art and by the terms of the appended claims.

I claim:

1. An envelope for an electron discharge device comprising a tubular metal shell with a flange extending radially outward from the rim of one end of the shell, a header for said shell comprising a metal cylindrical ring telescoped into said one end of the shell and a radial header flange on one end of said ring overlapping the shell flange, and a beveled metal band with its outer edge in annular engagement with the surface of said header flange, the side of the band being in annular contact with the rim of said shell, and the inner edge in annular contact with the ring of said header.

2. In combination, an envelope for an electron discharge device comprising a tubular metal shell with a flange extending radially outward from the rim of said shell, a header for said shell comprising a metal cylinder telescoped into the end of the shell and a radial flange on one end of said cylinder in registry with and joined gas-tight to the shell flange, and a metal bezel, the bezel being curved in cross section with the sloping side of the bezel in annular contact with the rim of said shell, the outer edge of the bezel being in annular engagement with the upper surface of said header flange, and the inner edge of the bezel being in contact with said cylinder.

3. In combination, an envelope for an electron discharge device comprising a tubular metal shell with a flange extending radially outward from the rim of said shell, a header for said shell comprising a metal ring telescoped into the end of the shell and a radial flange on one end of said ring in registry with and joined gas-tight to the shell flange, and a metal bezel, the bezel being conical in shape with the outer sloping side of the bezel being in annular contact with the rim of the shell and with the outer and inner edges of the bezel being in annular engagement, respectively, with the surface of said header flange and with said ring.

4. In combination an envelope for an electron discharge device comprising a tubular metal shell with a flange extending radially outward from the rim of said shell, a header for said shell comprising a metal ring telescoped into the end of the shell and a radial flange on one end of said ring in registry with and joined gas-tight to the shell flange, and a metal bezel, the bezel being convexed in cross section, the outer sloping convexed side of the bezel being in annular contact with the rim of said shell and the outer edge of the bezel being in annular engagement with the registering surface of said header flange and the inner edge of the bezel being in annular contact with the side of said ring.

NORVAL H. GREEN.